May 19, 1970

A. H. LINDQUIST
3,512,899
STAY RING FOR WATER TURBINES AND THE LIKE

Filed Feb. 6, 1968

INVENTOR
ARNE HERMAN LINDQUIST
BY Hame and Bayley
ATTORNEYS 3,512,899
STAY RING FOR WATER TURBINES
AND THE LIKE
Arne Herman Lindquist, Trollhattan, Sweden, assignor to Nydqvist & Holm Aktiebolag, Trollhattan, Sweden, a corporation of Sweden
Filed Feb. 6, 1968, Ser. No. 703,310
Claims priority, application Sweden, Feb. 9, 1967, 1,853/67
Int. Cl. F01d *17/14*
U.S. Cl. 415—126          2 Claims

ABSTRACT OF THE DISCLOSURE

This disclosure teaches a stay ring assembly which is particularly suitable for welded construction. A guide vane ring is built integrally with the stay ring and an array of guide vanes are operatively positioned in the assembly. Connected between the guide vanes and the guide vane ring is a bottom ring. It is desirable to limit clearances above and below the guide vanes. Toward this objective, by the present advance, the bottom ring (which controls vertical clearances on the guide vanes) is adjustable vertically by means of a number of threaded members spaced about the bottom ring and screwably engageable between the bottom ring and the guide vane ring so that the bottom ring may be raised or lowered either in toto or differentially about its circumference. By this expedient surface machining of the guide vane ring is made unnecessary.

CROSS REFERENCE

Priority is claimed on Swedish patent application 1,853/67 filed Feb. 9, 1967.

BACKGROUND

The present invention relates to stay rings for water turbines, pump turbines and pumps, and more particularly to stay rings of a welded design. It has previously been usual to cast stay rings from steel but owing to the development of welding techniques and a general tendency to larger units welding has come more and more to the foreground.

The stay ring comprises an upper and a lower ring member as well as a number of intermediate stay vanes which connect the two ring members. The stay ring serves dual purposes. Firstly it forms a part of the water flow paths, in that it guides the water from the spiral case positioned around the stay ring to the guide vane array therewithin (the array in turn surrounding the turbine wheel or runner) and secondly it takes up the forces between the spiral case, the head cover situated above the guide vane array and the guide vane ring positioned below the same, the latter ring member often being integral with the stay ring.

Attached between the guide vanes and the guide vane ring is a bottom ring. To obtain minimum leakage when the guide vanes are closed, it is necessary that the clearance between the guide vanes and the turbine head cover as well as between the guide vanes and the bottom ring be kept as small as possible. A number of constructions, all more or less expensive and complicated, have been suggested for this purpose. The most common suggestion is one in which the clearance is kept as small as possible by prescribing small tolerances on stay ring, head cover and guide vanes. However, this increases the price of the product considerably.

The bottom ring normally lies on a machined surface on the underlying lower guide vane ring, which as mentioned above is often built integral with the stay ring. It is difficult during assembly to maintain the flatness of this surface, particularly when (as is often the case) the stay ring with the guide vane ring is cast in concrete. In this connection the said surface tends to be wavy, and consequently inserts must be placed between the machined surface and the bottom ring.

SUMMARY OF INVENTION

The present invention is concerned with an arrangement in a stay ring for water turbines, pump turbines and pumps having a lower guide vane ring integral with the stay ring. This teaching is directed toward avoiding the above mentioned disadvantages.

According to the present invention the bottom ring is adjustable vertically relative to the lower guide vane ring by means of a number of threaded sleeves spaced about the bottom ring, said sleeves being threaded in the bottom ring or the guide vane ring and abutting said guide vane ring and bottom ring, respectively, so that the bottom ring can be raised and/or lowered relative to the guide vane ring.

Because of this expedient it is not necessary to machine the guide vane ring on the plane supporting the bottom ring and, furthermore, any irregularities in the surface of the guide vane ring can be compensated for and the clearance between the guide vanes and the bottom ring can easily be adjusted to a desirable magnitude. The tolerances on the stay ring, head cover and guide vanes can therefore be kept relatively large, which considerably reduces manufacturing costs.

DRAWINGS

The foregoing and other features will appear more fully from the accompanying drawings.

PREFERRED EMBODIMENT

Figure 1:
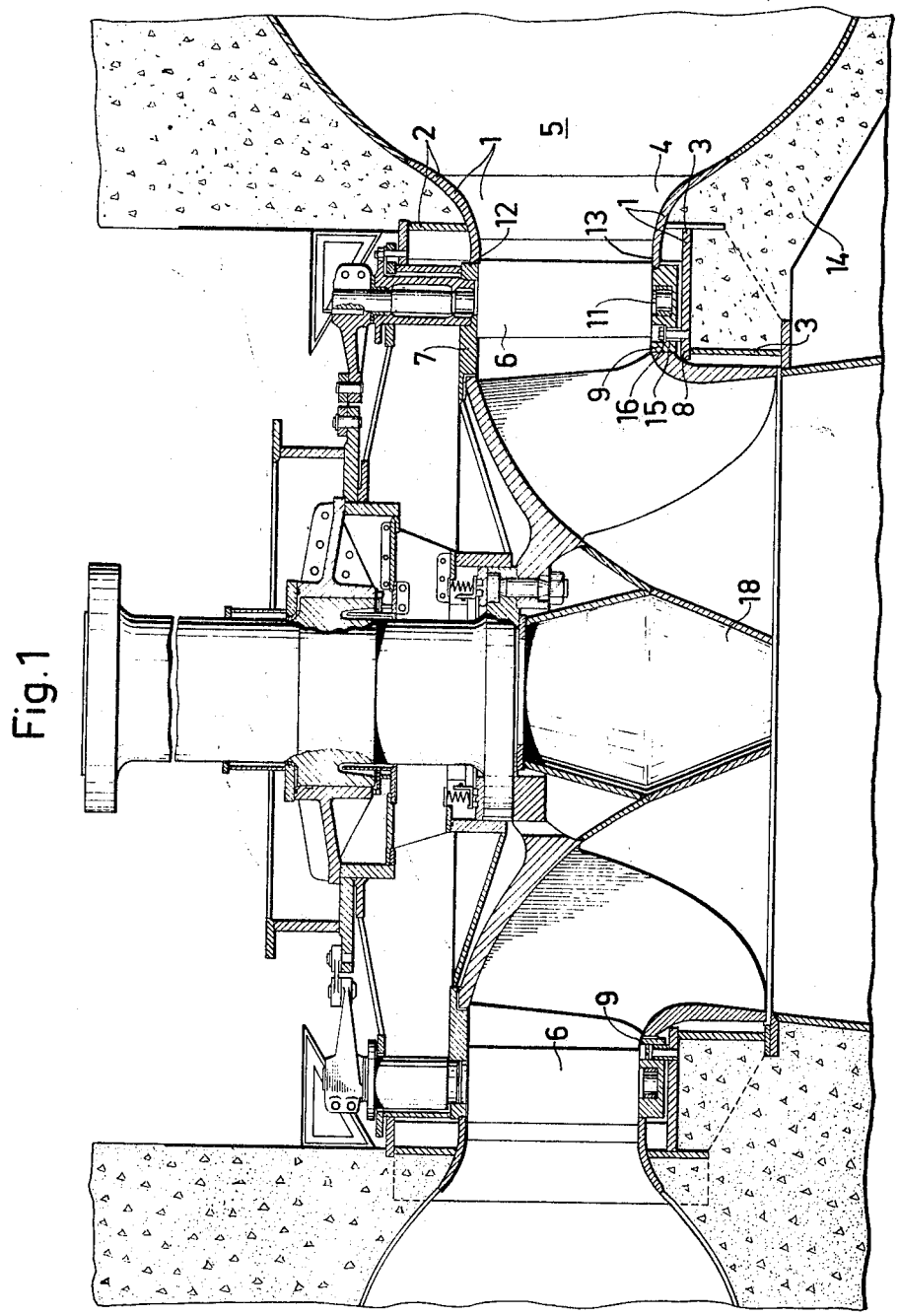
FIG. 1 is a broken view partly in section of a complete turbine.

In the shown embodiment stay ring 1 comprises upper ring 2, lower ring 3 and stay posts 4, which are welded together. In the case of large stay rings the rings can be divided into halves, quarters or a larger number of pieces which are welded together at the assembly site. This is desirable from the point of view of transportation when large turbines are concerned, and is made possible by the arrangement of this invention. Lower ring 3 of the stay ring is joined (welded) to lower guide vane ring 8 and the complete unit is embedded in concrete foundation 14.

Guide vane ring 8 carries bottom ring 9, in which rotatable guide vanes 6 are journalled at the bottom. Guide vanes 6 are journalled at the top in turbine head cover 7.

Inner peripheral surfaces 12, 13 of rings 2 and 3 seal against head cover 7 and bottom ring 9, respectively. Subsequent to the assembly of the stay ring these surfaces can be ground with a grinding machine, set up on a center rod positioned in the center on the turbine and rotated along the periphery.

Figure 2:
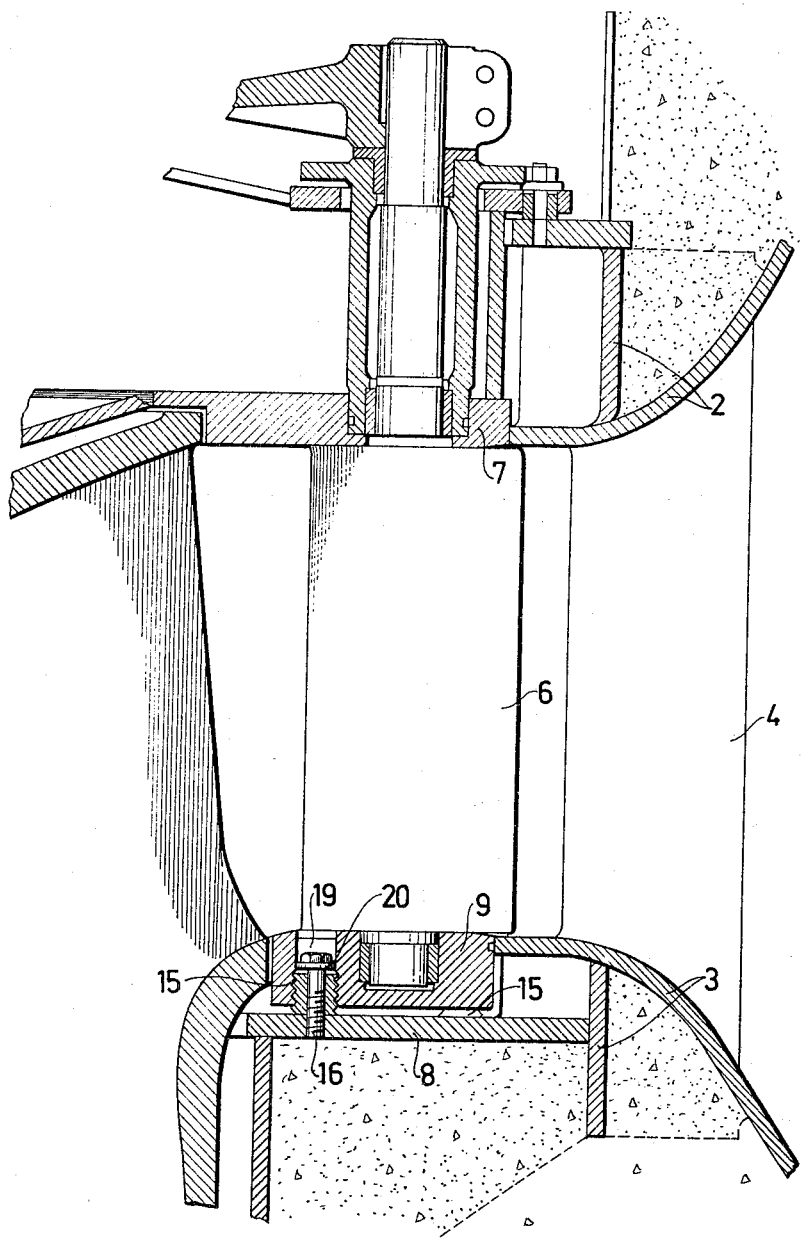
FIG. 2 shows a broken view in section through a stay ring and a guide ring according to the present teaching in enlarged scale.

As mentioned above the stay ring guides the water from the spiral case 5 to the guide ring, which consists of guide vanes 6, head cover 7 and bottom ring 9, from where the water is passed to turbine runner 18. Guide vanes 6 are rotatable in that they are journalled in head cover 7 and bottom ring 9. The clearances between those members are adjusted according to the invention by means of threaded sleeves 15, as can be best seen from FIG. 2. The said sleeves are threaded in holes 19 which are spaced about the inner and outer circumference of bottom ring 9, and abut guide vane ring 8. The sleeves are provided at the top with grooves for screw-drivers to facilitate turning them. By screwing down the sleeves it is possible to adjust the clearance between the guide vanes and head cover 7 and bottom ring 9 to a desired extent and simultaneously compensate for irregularities in the upper surface of guide vane ring 8, in a simple manner. Subsequent to completion of the aforegoing, securing screws 16 can be positioned and tightened. Screws 16 bear, via washers, against abutment surfaces 20 in holes 19.

If the grouting of the stay ring is performed in such a way that guide ring 8 can be reached from below, sleeves 15 and securing screws 16 may be inserted from below (i.e. sleeves 15 threaded in ring 8 and abutting bottom ring 9 instead of vice versa).

What is claimed is:

1. An assembly including a stay ring and an array of guide vanes for a water turbine and comprising in combination:
   a lower guide vane ring organized in a plurality of parts for being field welded together as an integral assembly with the stay ring which is likewise organized in a plurality of parts from being field welded,
   a bottom ring arranged between the lower guide vane ring and the guide vanes,
   adjustment means for moving the bottom ring vertically relative the lower guide vane ring to control clearances of the guide vanes and comprising a plurality of sleeves threaded on their outsides and disposed about the bottom ring and in abutment between the bottom ring and the lower guide vane ring with each of the sleeves screwably engageable to move the bottom ring vertically.

2. The assembly according to claim 1 with the sleeves encircling screws which connect the bottom ring to the lower guide vane ring.

References Cited

UNITED STATES PATENTS

| | | | |
|---|---|---|---|
| 1,345,493 | 7/1920 | Jacobson | 253—122 |
| 1,462,483 | 7/1923 | Carpenter | 253—122 |
| 1,517,896 | 12/1924 | Enz | 253—122 |
| 1,817,654 | 8/1931 | Terry | 253—122 |
| 1,823,702 | 9/1931 | Ring | 253—122 X |
| 3,360,241 | 12/1967 | Lindquist | 253—122 |

FOREIGN PATENTS 1,196,589   7/1965   Germany.

EVERETTE A. POWELL, JR., Primary Examiner

U.S. Cl. X.R.

415—217